(12) United States Patent
Burtsev et al.

(10) Patent No.: US 11,689,310 B2
(45) Date of Patent: Jun. 27, 2023

(54) METHOD AND SYSTEM FOR PROVIDING A MAXIMUM CHANNEL CAPACITY IN A WAVELENGTH DIVISION MULTIPLEXING TRANSMISSION SYSTEM

(71) Applicant: ADVA Optical Networking SE, Meiningen OT Dreissigacker (DE)

(72) Inventors: Sergey Burtsev, Duluth, GA (US); Steven Searcy, Atlanta, GA (US); Thomas Richter, Atlanta, GA (US); Sorin Tibuleac, Johns Creek, GA (US)

(73) Assignee: ADVA OPTICAL NETWORKING SE, Meiningen Dreissigacker (DE)

( * ) Notice: Subject to any disclaimer, the term of this patent is extended or adjusted under 35 U.S.C. 154(b) by 60 days.

(21) Appl. No.: 17/237,966

(22) Filed: Apr. 22, 2021

(65) Prior Publication Data
US 2022/0353003 A1  Nov. 3, 2022

(51) Int. Cl.
*H04J 14/02* (2006.01)
*H04B 10/079* (2013.01)

(52) U.S. Cl.
CPC .... *H04J 14/0227* (2013.01); *H04B 10/07953* (2013.01)

(58) Field of Classification Search
CPC ............ H04J 14/0227; H04B 10/07953
See application file for complete search history.

(56) References Cited

U.S. PATENT DOCUMENTS

| | | | |
|---|---|---|---|
| 8,855,495 B2 | 10/2014 | Zhou et al. | |
| 9,438,369 B2 | 9/2016 | Swinkels et al. | |
| 9,628,189 B2 * | 4/2017 | Châtelain | H04B 10/25073 |
| 10,389,473 B1 | 8/2019 | Vassilieva et al. | |
| 10,439,751 B2 | 10/2019 | Roberts et al. | |
| 10,530,516 B2 * | 1/2020 | Jiang | H04J 14/0221 |
| 10,700,807 B1 * | 6/2020 | Vassilieva | H04J 14/06 |

(Continued)

FOREIGN PATENT DOCUMENTS

| | | |
|---|---|---|
| EP | 3 579 460 A1 | 12/2019 |
| EP | 3 621 218 A1 | 3/2020 |

(Continued)

OTHER PUBLICATIONS

Pan et al., "Real-Time Investigation and Prediction of Transmission Penalties for PDM-8QAM/16QAM Super-Channels in Flexible Grid DWDM Networks," OFC 2017, pp. 1-3 (2017).

(Continued)

*Primary Examiner* — Tanya T Motsinger
(74) *Attorney, Agent, or Firm* — Jenkins, Wilson, Taylor & Hunt, P.A.

(57) ABSTRACT

A method for providing a maximum channel capacity per optical channel in an optical wavelength division multiplexing, WDM, transmission system is described. The WDM transmission system includes transceivers using multiple optical channels in a WDM channel grid to transport optical signals modulated with a modulation format with a signal symbol rate, SR, via an optical transmission link, OTL, along an optical path from a transmitting transceiver to a receiving transceiver. A channel capacity of the optical channel is maximized while a calculated channel margin, CM, is maintained above a preset minimal channel margin value.

14 Claims, 11 Drawing Sheets

(56) References Cited

U.S. PATENT DOCUMENTS

| | | | | |
|---|---|---|---|---|
| 2011/0299574 | A1* | 12/2011 | Rofougaran | H03D 7/165 375/219 |
| 2014/0341595 | A1* | 11/2014 | Harley | H04B 10/07953 398/208 |
| 2017/0310392 | A1* | 10/2017 | Boertjes | H04Q 11/0062 |
| 2018/0139698 | A1* | 5/2018 | Quinlan | H04Q 9/00 |
| 2019/0319702 | A1* | 10/2019 | Gazzola | H04J 14/0272 |
| 2020/0076501 | A1* | 3/2020 | Searcy | H04B 10/58 |
| 2021/0344418 | A1* | 11/2021 | Crognale | H04J 14/0224 |
| 2022/0353003 | A1* | 11/2022 | Burtsev | H04J 14/026 |

FOREIGN PATENT DOCUMENTS

| | | |
|---|---|---|
| WO | WO 2009/100252 A2 | 8/2009 |
| WO | WO 2009/100252 A3 | 8/2009 |
| WO | WO 2015/178997 A1 | 11/2015 |

OTHER PUBLICATIONS

Pan et al., "Real-Time ROADM Filtering Penalty Characterization and Generalized Precompensation for Flexible Grid Networks," IEEE Photonics Journal, vol. 9, No. 3, pp. 1-11 (Jun. 2017).

Poggiolini et al., "Analytical and Experimental Results on System Maximum Reach Increase Through Symbol Rate Optimization," Journal of Lightwave Technology, vol. 34, No. 8, pp. 1872-1885 (Apr. 15, 2016).

Pastorelli et al., "Network Planning Strategies for Next-Generation Flexible Optical Networks [Invited]," J. Opt. Commun. Netw., vol. 7, No. 3, pp. A511-A525 (Mar. 2015).

Poggiolini, "The GN Model of Non-Linear Propagation in Uncompensated Coherent Optical Systems," Journal of Lightwave Technology, vol. 30, No. 24, pp. 3857-3879 (Dec. 15, 2012).

Communication of the Extended European Search Report for European Patent Application Serial No. 21182164.0 (dated Dec. 23, 2021).

* cited by examiner

| | |
|---|---|
| GOSNR (dB/0.1nm) | 21 |
| RX Psig (dBm/Ch) | -5 |
| Channel slot (GHz) | 75 |
| link 6dB BW (GHz) | 64.44 |
| SR init (Gbd) | 69.44 |
| k-parameter, zero margin (bits/symbol) | 3.89 |
| Channel capacity (Gbs), zero margin | 389.03 |
| k-parameter, Optimum (bits/symbol) | 3.63 |
| Symbol Rate, Optimum (GBd) | 66.95 |
| Channel Capacity, Optimum (Gb/s) | 350 |
| Channel Q, Optimum (dBQ) | 6.06 |
| Channel Margin, Optimum (dBQ) | 1.02 |
| Passband penalty, Optimum (dBQ) | 0.42 |

Fig. 8

| | |
|---|---:|
| GOSNR (dB/0.1nm) | 21 |
| RX Psig (dBm/Ch) | -5 |
| Channel slot (GHz) | 75 |
| link 6dB BW (GHz) | 64.44 |
| SR init (Gbd) | 69.44 |
| k-parameter, zero margin (bits/symbol) | 3.89 |
| Channel capacity (Gbs), zero margin | 389.03 |
| k-parameter (bits/symbol) | 3.00 |
| Symbol Rate (GBd) | 69.44 |
| Channel Capacity (Gb/s) | 300 |
| Channel Q (dBQ) | 7.25 |
| Channel Margin (dBQ) | 2.21 |
| Passband penalty (dBQ) | 0.93 |

Fig. 9

| GOSNR (dB/0.1nm) | Channel Capacity, Optimum (Gb/s) | k-parameter, Optimum (bits/symbol) | Symbol Rate, Optimum (GBd) | Channel Q, Optimum (dBQ) | Channel Margin, Optimum (dBQ) | Passband penalty, Optimum (dBQ) |
|---|---|---|---|---|---|---|
| 15 | 200.0 | 2.1 | 65.8 | 6.3 | 1.3 | 0.3 |
| 16 | 200.0 | 2.1 | 64.8 | 7.1 | 2.1 | 0.3 |
| 17 | 250.0 | 2.6 | 66.3 | 6.2 | 1.1 | 0.4 |
| 18 | 250.0 | 2.7 | 65.1 | 6.9 | 1.9 | 0.4 |
| 19 | 300.0 | 3.1 | 66.6 | 6.1 | 1.1 | 0.4 |
| 20 | 300.0 | 3.2 | 65.8 | 6.8 | 1.8 | 0.4 |
| 21 | 350.0 | 3.6 | 67.0 | 6.1 | 1.0 | 0.4 |
| 22 | 350.0 | 3.7 | 66.2 | 6.7 | 1.6 | 0.4 |
| 23 | 350.0 | 3.7 | 65.6 | 7.2 | 2.2 | 0.4 |
| 24 | 400.0 | 4.2 | 66.7 | 6.5 | 1.4 | 0.4 |
| 25 | 400.0 | 4.2 | 66.2 | 7.0 | 1.9 | 0.4 |
| 26 | 450.0 | 4.6 | 67.4 | 6.2 | 1.2 | 0.5 |
| 27 | 450.0 | 4.7 | 66.9 | 6.6 | 1.6 | 0.4 |
| 28 | 450.0 | 4.7 | 66.4 | 7.0 | 1.9 | 0.4 |
| 29 | 500.0 | 5.1 | 67.6 | 6.3 | 1.2 | 0.4 |
| 30 | 500.0 | 5.2 | 67.1 | 6.5 | 1.5 | 0.4 |
| 31 | 500.0 | 5.2 | 66.7 | 6.8 | 1.7 | 0.4 |
| 32 | 550.0 | 5.6 | 67.8 | 6.1 | 1.0 | 0.4 |
| 33 | 550.0 | 5.7 | 67.5 | 6.3 | 1.2 | 0.4 |
| 34 | 550.0 | 5.7 | 67.1 | 6.4 | 1.4 | 0.4 |
| 35 | 550.0 | 5.7 | 66.9 | 6.5 | 1.5 | 0.4 |
| 36 | 550.0 | 5.7 | 66.7 | 6.6 | 1.6 | 0.4 |
| 37 | 550.0 | 5.7 | 66.4 | 6.7 | 1.7 | 0.4 |

Fig. 10

METHOD AND SYSTEM FOR PROVIDING A MAXIMUM CHANNEL CAPACITY IN A WAVELENGTH DIVISION MULTIPLEXING TRANSMISSION SYSTEM

TECHNICAL FIELD

The invention relates to a method and system for providing a maximum channel capacity per optical channel in an optical wavelength division multiplexing, WDM, transmission system.

TECHNICAL BACKGROUND

A wavelength division multiplexing, WDM, transmission system is an optical transmission system which is based on optical fibers as transmission media. A wavelength division multiplexing system comprises optical amplifiers which can be used to compensate for signal losses in optical fiber spans. An optical signal is transmitted from a transmitting transceiver via an optical transmission link along an optical path to a receiving transceiver. The transceivers are also related to as transponders, muxponders or XPDR. The transceivers can be integrated in a terminal equipment of a user. An optical wavelength division multiplexing system supports multiplexing and transmission of multiple optical channels provided in a WDM channel grid. Further, reconfigurable optical add/drop multiplexers ROADMs can be provided to add and/or remove traffic from the wavelength division multiplexing system at the optical layer. An optical communication channel transmitted within the WDM transmission system comprising ROADMs or other optical filters along the optical signal path is subject to multiple transmission impairments including amplified spontaneous emission (ASE) noise, nonlinear noise, optical filtering and other impairments. Transceivers allow to tune multiple signal characteristics of the optical signal including its symbol rate, its modulation format, probabilistic shaping type, and/or a forward error correction, FEC type. Multiple combinations of transceiver parameters can yield the same data rate, yet only some combinations may allow the optical signal to be transmitted error-free on a given link subject to transmission impairments. A possible combination of transponder or transceiver parameters can yield the highest operating channel margin. Conversely, assuming a fixed operating channel margin (potentially zero), a combination of transceiver parameters can yield a highest channel capacity per optical channel.

Accordingly, there is a need to provide a method which allows to determine optical signal parameters which provide a highest channel capacity on a given optical path within an optical wavelength division multiplexing transmission system.

SUMMARY OF THE INVENTION

The invention provides according to a first aspect a method for providing a maximum channel capacity per optical channel in an optical wavelength division multiplexing, WDM, transmission system with transceivers using multiple optical channels in a WDM channel grid to transport optical signals modulated with a modulation format with a signal symbol rate, SR, via an optical transmission link, OTL, along an optical path from a transmitting transceiver to a receiving transceiver, wherein a channel capacity of the optical channel is maximized while a calculated channel margin, CM, is maintained above a preset minimal channel margin value.

In a possible embodiment, the channel margin, CM, is calculated based on a system performance parameter, like Q, or calculated based on performance metric which depends on a signal symbol rate, SR, a bits per symbol parameter, k, of the used modulation format, and/or depends on a link effective channel bandwidth.

In a possible embodiment of the method according to the first aspect of the present invention, the system performance parameter, Q, of the WDM transmission system is a derivative of a bit error ratio, BER, measured for the respective optical channel.

In a further possible embodiment of the method according to the first aspect of the present invention, the optical signal transported within the optical channel via the optical transmission link, OTL, is modulated with a quadrature amplitude modulation, QAM, format using $2^K$ constellation points with k being the bits per symbol parameter of the used QAM modulation format.

The optical transmission link, OTL, of the transmission system can comprise ROADMs and/or one or more optical filters.

In a further possible embodiment of the method according to the first aspect of the present invention, a signal optical power of the optical signal transported within the respective optical channel via the optical transmission link, OTL, is optimized on the basis of a link generalized optical signal to noise ratio, GOSNR.

In a possible embodiment of the method according to the first aspect of the present invention, the generalized optical signal-to-noise ratio, GOSNR, representing the noise related impairments of the optical transmission link, OTL, is defined as a ratio between the signal optical power of the optical signal launched by the transmitting transceiver of the optical transmission link, OTL, into the optical path and the accumulated noise along the optical path of the optical transmission link, OTL.

The accumulated noise along the optical path of the optical transmission link, OTL, includes amplified spontaneous emission, ASE, noise generated by optical amplifiers represented by a cumulative ASE noise optical power, $P_{ASE,link}$, and noise due to fiber nonlinearities, NLI, accumulated over link spans of the optical transmission link, OTL, and represented by a cumulative NLI optical power, $P_{NLI,link}$.

In a further possible embodiment of the method according to the first aspect of the present invention, the generalized optical signal to noise ratio, GOSNR, is maximized for each link span of the optical transmission link, OTL, to optimize the signal power of the optical signal transported within the respective optical channel along the optical path of the optical transmission link, OTL.

In a further possible embodiment of the method according to the first aspect of the present invention, a maximum generalized optical signal-to-noise ratio of the optical transmission link, OTL, is obtained by summation over the maximized generalized optical signal to noise ratios, GOSNRs, over all link spans along the optical path of the respective optical transmission link, OTL.

In a further possible embodiment of the method according to the first aspect of the present invention, a link effective bandwidth of the optical transmission link, OTL, is calculated which represents the passband filtering-related impairments caused by optical filters provided along the optical path of the optical transmission link, OTL.

In a further possible embodiment of the method according to the first aspect of the present invention, the link effective bandwidth of the optical transmission link, OTL, is calculated by multiplying filter functions of link cascaded wavelength-selective switch modules, WSS modules, and/or optical filters provided along the optical path of the respective optical transmission link, OTL.

In a further possible embodiment of the method according to the first aspect of the present invention, an initial value, $SR_0$, of the signal symbol rate, SR, of the optical signal transported within the optical channel via the optical transmission link, OTL, is preset and used to maximize the channel capacity of the respective optical channel.

In a still further possible embodiment of the method according to the first aspect of the present invention, a channel frequency slot, $\Delta f$, forming a frequency spectrum range assigned to an optical channel in the WDM channel grid of the WDM transmission system is preset.

In a still further possible embodiment of the method according to the first aspect of the present invention, the initial value, $SR_0$, of the signal symbol rate, SR, is set based on a preset channel guard band defined as the difference between the channel frequency slot, $\Delta f$, and the signal symbol rate, SR. It is a possible embodiment to pre-set the initial symbol rate ($SR_0$) but there are also other options to pre-set the initial symbol rate.

In a further possible embodiment of the method according to the first aspect of the present invention, the system performance parameter, Q, of the optical WDM transmission system which depends on the link effective bandwidth, BW, of the optical transmission link, OTL, representing the passband filtering-related impairments of the optical transmission link, OTL, and which depends on the generalized optical signal to noise ratio, GOSNR, representing the noise related impairments of the optical transmission link, OTL, is optimized iteratively until the calculated channel margin, CM, is equal or larger than the preset channel margin target.

In a still further possible embodiment of the method according to the first aspect of the present invention, the channel capacity of the optical channel is maximized to provide a maximum channel capacity during a design phase where the optical WDM transmission system is planned.

In a still further possible embodiment of the method according to the first aspect of the present invention, the channel capacity of the optical channel is maximized to provide a maximum channel capacity during a turn-up procedure to establish the optical channel via the optical transmission link, OTL, in the optical WDM transmission system deployed in the field.

In a still further possible embodiment of the method according to the first aspect of the present invention, the optical signal transported within the optical channel along the optical transmission link, OTL, comprises a digital bit stream.

In a still further possible embodiment of the method according to the first aspect of the present invention, a forward error correction, FEC, overhead, OH, is added to the digital bit stream transmitted by the transmitting transceiver via the optical transmission link, OTL, to the receiving transceiver to provide FEC functionality at the receiving transceiver.

In a still further possible embodiment of the method according to the first aspect of the present invention, the bit error ratio, BER, of an optical channel is measured and evaluated at the receiving transceiver of the optical transmission link, OTL.

The bit error ratio, BER, corresponding to the BER before forward error correction, FEC, referred to as pre-FEC BER is used in a possible embodiment to derive the system performance parameter, pre FEC Q, of the WDM transmission system for the respective optical transmission link, OTL, wherein the derived system performance parameter, pre-FEC Q, is used for determining a maximum channel capacity for the respective optical channel.

The method according to the first aspect of the present invention comprises a computer-implemented method which can be either used in a design phase to plan a wavelength division multiplexing system and/or during an operation phase where the wavelength division multiplexing system is already deployed in the field. The computer-implemented method according to the first aspect of the present invention is computationally efficient and minimizes a time required for performing a signal optimization in the context of either a network planning activity with many signals transmitted across different optical paths or routes and requiring different optimum settings or in the context of an optimization procedure used in a WDM system with software-defined transceivers and including optical filters, in particular reconfigurable optical add/drop multiplexers ROADMs.

The invention provides according to a further aspect an apparatus comprising a processor adapted to execute the computer implemented method according to the first aspect of the present invention to maximize the channel capacity of at least one optical channel of a WDM system.

The invention provides according to a further aspect a wavelength division multiplexing, WDM, system comprising optical channels in a WDM channel grid used to transport with a signal symbol rate, SR, optical signals each modulated with a modulation format via an optical transmission link, OTL, along a signal path from a transmitting transceiver to a receiving transceiver of the WDM system and comprising a controller adapted to maximize a channel capacity for each optical channel while maintaining a calculated channel margin, CM, of the optical channel above a preset minimal channel margin value.

The channel margin, CM, is calculated in a preferred embodiment based on a system performance parameter, Q, or calculated based on another performance metric.

The system performance parameter, Q, or the other performance metric used to calculate the channel margin, CM, depend in a preferred embodiment on the signal symbol rate, SR, a bits per symbol parameter, K, of the modulation format and/or on a link effective channel bandwidth.

The invention further provides according to a further aspect a wavelength division multiplexing, WDM, system design tool used for planning a wavelength division multiplexing, WDM, system, wherein the WDM system design tool is adapted to provide a maximum channel capacity per optical channel in the optical WDM transmission system having transceivers using multiple optical channels in a WDM channel grid to transport optical signals modulated with a modulation format with a signal symbol rate, SR, via an optical transmission link, OTL, along an optical path from a transmitting transceiver to a receiving transceiver, wherein a channel capacity of the optical channel is maximized while maintaining a calculated channel margin, CM, of the optical channel above a minimal channel margin value.

The calculated channel margin, CM, depends on a system performance parameter, Q, or another performance metric.

The system performance parameter, Q, and the other performance metric used to calculate the channel margin, CM, depend on the signal symbol rate, SR, a bits per symbol parameter, k, of the used modulation format and/or depend on a link effective channel bandwidth.

BRIEF DESCRIPTION OF FIGURES

In the following, different aspects of the present invention are described in more detail with reference to the enclosed figures.

FIG. 8 shows a Table to illustrate an example of a channel optimization using a computer-implemented method according to the present invention with 350 Gbs maximum channel capacity, with the link signal GOSNR set at 21 dB/0.1 nm;

FIG. 9 shows that without using the method according to the present invention the channel maximum capacity is 300 Gbs only at the same signal and link settings;

FIG. 10 shows a further Table for illustrating optimization results when using a computer-implemented method according to the present invention for signal link GOSNR ranging from 15 dB/0.1 nm to 37 dB/0.1 nm, FIG. 8 results represent a special case of FIG. 10 at GOSNR=21 dB/0.1 nm;

DETAILED DESCRIPTION OF EMBODIMENTS

Figure 1:
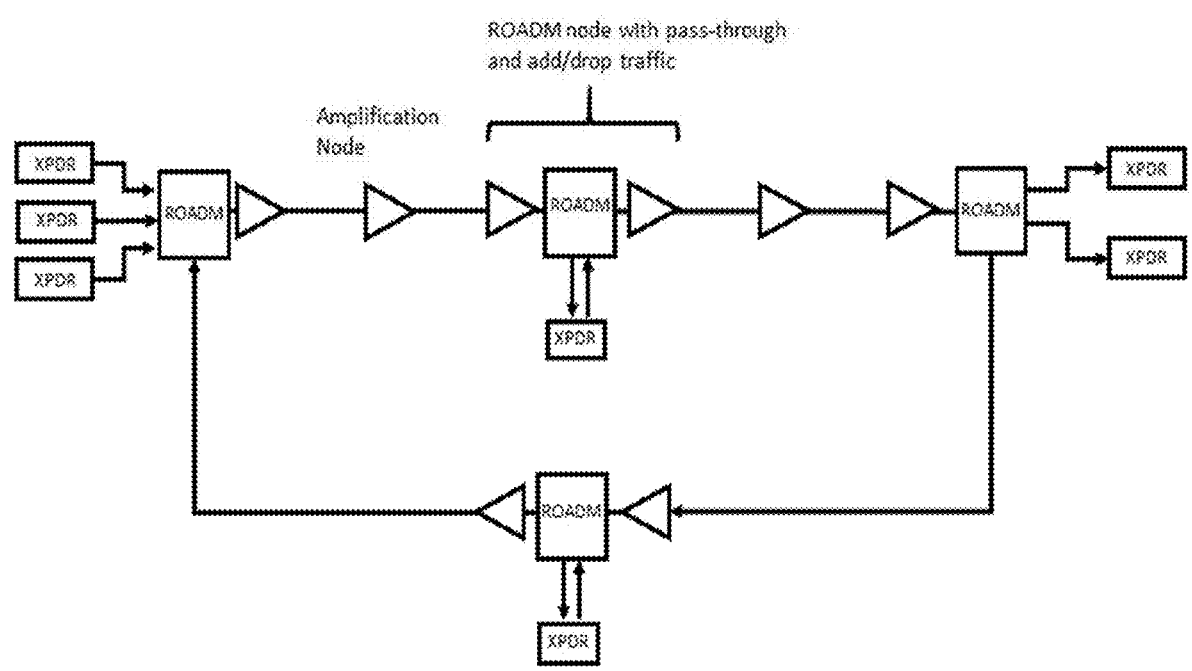
FIG. 1 illustrates an exemplary wavelength division multiplexing, WDM, transmission system where the computer implemented method according to the first aspect of the present invention can be applied.

FIG. 1 illustrates an exemplary optical wavelength division multiplexing, WDM, transmission system where the computer-implemented method according to the present invention can be used for channel capacity optimization. FIG. 1 illustrates a ring WDM network with some reconfigurable optical add/drop multiplexers ROADMs which are provided for a power equalization and/or traffic add/drop functionality. The optical wavelength division multiplexing, WDM, transmission system comprises transceivers XPDR which are adapted to transmit and/or to receive optical signals. The optical wavelength division multiplexing, WDM, transmission system as shown in FIG. 1 comprises transceivers using multiple optical channels in a WDM channel grid to transport optical signals modulated with a modulation format and transmitted with a signal symbol rate SR via an optical transmission link OTL along an optical signal path from a transmitting transceiver to a receiving transceiver. Optical amplifiers are provided as amplification nodes along the optical transmission link and can be used to compensate for signal losses in a span fiber of the optical transmission link, OTL. The reconfigurable optical add/drop multiplexers ROADMs allow to remotely add or remove data traffic from a wavelength division multiplexing, WDM, system at the wavelength layer. The WDM channel grid used by the WDM system can comprise either a fixed or flexible optical bandwidth allocation per data channel. For instance, in a 96 ch C-band system using a fixed frequency grid, there is a 50 GHz bandwidth allocation per optical data channel. The channel central frequencies range from 196.0 THz to 191.25 THz. The channel frequency slot $\Delta f$ forms a frequency spectrum range assigned to an optical channel in the flexible or fixed WDM channel grid of the WDM transmission system. The channel frequency slot $\Delta f$ can also be referred to as channel slot or channel bandwidth. The channel frequency slot $\Delta f$ can be assigned for an optical channel in the WDM channel grid. The channel frequency slot $\Delta f$ comprises typically a frequency spectrum range of 50 GHz, 75 GHz or 100 GHz. An operator of the WDM transmission system is interested in making most efficient use of the network infrastructure and has therefore a desire in achieving a highest transmission capacity in the fiber optic links of the WDM transmission system. The latest generation of commercial fiber optic transmission systems use transceivers with coherent receivers. Coherent receivers have the capability to adjust one or several characteristics of the signal including a symbol rate SR, a modulation format, a channel spacing, a signal spectral shape and/or a FEC type. Such flexibility in transceiver configurations allows the network operator of the WDM transmission system to adjust transceiver capacity in small increments, thereby achieving a maximum error-free transmission capacity available on any given fiber optic link without having excessive system margins.

The channel performance of an optical channel and its spectral efficiency depends on both optical line transmission characteristics and coherent transceiver settings. On a given optical transmission link OTL, a network planning process does account for a set of wavelength division multiplexing, WDM, transmission equipment and the used coherent transceivers. The WDM transmission equipment of a WDM transmission system as illustrated in FIG. 1 may comprise optical fibers, amplifiers, reconfigurable optical add/drop multiplexers ROADMs, and other WDM system components. Accordingly, a conventional WDM transmission system can comprise a broad scope of performance dependencies which require a numerically fast simple modeling method and performance optimization procedures. The computer-implemented method according to the present invention can account for various types of signal performance impairments including noise related impairments of the optical transmission link OTL and passband filtering-related impairments of the optical transmission link OTL. The signal link impairments include amplified spontaneous emission (ASE) noise, nonlinearities due to fiber propagation, passband filtering impairments due to ROADMs, channel crosstalk, etc., and coherent transceiver signal impairments including transceiver noise, receiver sensitivity penalty, etc.

Further, interdependencies of impairments are taken into account. Further, impairments may scale with transceiver setting like symbol rate SR and number of bits per symbol (bits/symbol) represented by a bits per symbol parameter K of the used modulation format.

For most fiber optic transmission links, the most significant transmission impairments determining a total capacity of the optical transmission link OTL within a given spectral bandwidth are amplified spontaneous emission (ASE) noise generated by optical amplifiers along the optical transmission link and fiber nonlinear effects which for dispersion uncompensated links can be approximated as noise with a Gaussian distribution, similar to ASE noise. Other line and transceiver impairments can be treated as additive independent Gaussian noises. Generally, there is a trade-off between signal link OSNR and nonlinear impairments. A signal having a low signal power launched into the optical fiber yields a low OSNR, which reduces the available transmission rate. In contrast, a signal with a high signal power launched into the fiber increases signal nonlinear impairments resulting in a lower transmission rate. To compute an optimal power that realizes the trade-off between signal link OSNR and nonlinearities, the computer-implemented method according to the present invention uses in a possible embodiment a generalized OSNR (GOSNR) and a corresponding Gaussian noise (GN) model. The Gaussian noise (GN) model depends on a signal symbol rate SR, but does not depend on a signal modulation format. Once a signal spectral slot has been fixed, a signal symbol rate value can be chosen close enough to a spectral slot value to maximize a spectral efficiency. In this way, it is possible to estimate the optimal signal power in each optical fiber span that maximizes the link GOSNR for a given WDM system configuration. In this way, it is possible to decouple signal line power optimization from an overall signal optimization process leading to a significant simplification and numerical speed boost. In addition, a signal power optimization does help to increase system margins for any choice of modulation format parameterized with a bits per symbol parameter K. Once a line optimization has been performed, it is possible to proceed to a channel capacity maximization measured in bits per second for a general mQAM modulation format where the bits per symbol variable K and the signal symbol rate SR are adjustable. The general relationship between channel capacity and bits per symbol parameter K and the symbol rate SR per signal polarization is:

channel capacity(bits/sec)=signal symbol rate SR(symbols/sec)*bits per symbol parameter $K$(bits/symbol).

The computer-implemented method according to the first aspect of the present invention can also be applied to WDM networks including ROADMs or fixed OADMs nodes which are critical components used in modern fiber optic networks. In these kinds of networks, there can be a performance impairment due to optical filtering of the optical signal. This impairment caused by optical filtering can limit the maximum capacity achievable on a given optical transmission link OTL including one or more ROADMs along its optical signal path. At a fixed channel rate and fixed GOSNR, a high bits per symbol value K does increase spectral efficiency but does deteriorate the signal quality measured as a bit error ratio BER, a system parameter Q, a signal to noise ratio SNR, or other performance metric due to the smaller distance between the constellation points of the QAM modulation format while low values of bits per symbol K do result in higher symbol rate SR which in turn leads to a higher passband filtering impairment caused by ROADMs, thereby also deteriorating the signal quality of the transported optical signal. Accordingly, the method of the present invention is provided to achieve a good trade-off between two different impairments, i.e. the GOSNR-related impairments of the optical transmission link OTL and the passband filtering-related impairments and is adapted to optimize the transceiver characteristics to achieve an optimal trade-off between the two above-mentioned impairments. The computer-implemented method according to the present invention is especially applicable for a WDM system comprising coherent transceivers with software-defined characteristics. The method can be used to operate a WDM system with software-defined coherent transceivers to overcome constraints caused by ROADM-based channel add/drop requirements, whereby the method optimizes a signal symbol rate SR and a modulation format to achieve a maximum channel capacity per optical channel in the optical wavelength division multiplexing, WDM, transmission system. A WDM system with software-defined coherent transceivers being subject to bandwidth constraints caused by ROADMs or other optical filters is optimized to achieve a maximum channel capacity per optical channel. The method according to the present invention provides a maximum channel capacity per optical channel in an optical wavelength division multiplexing, WDM, transmission system with transceivers using multiple optical channels in a flexible or defined fixed WDM channel grid to transport optical signals modulated with a modulation format, in particular a QAM modulation format, with a signal symbol rate SR via an optical transmission link OTL along an optical signal path from a transmitting transceiver to a receiving transceiver. The channel margin CM of the optical channel calculated based on a system performance parameter Q, which depends on a signal symbol rate SR and a bits per symbol parameter K of the used modulation format, can be optimized iteratively using increments until the calculated channel margin CM of the optical channel is equal or larger than a preset channel margin target.

In a preferred embodiment, the system performance parameter Q of the WDM transmission system is a derived from a bit error ratio BER which can be measured for the respective optical channel. A bit error ratio BER can comprise a ratio at which errors occur in a digital bit stream transported in the optical channel. A bit error ratio BER can comprise a measured characteristic which is typically measured at the receiving side of the optical transmission link OTL.

In a preferred embodiment of the method according to the present invention, the optical signal transported within the optical channel via the optical transmission link OTL is modulated with a quadrature amplitude modulation, QAM, format using $2^K$ constellation points, wherein k is the bits per symbol parameter of the used QAM modulation format. The quadrature amplitude modulation format QAM is a data encoding type used in modern data transmission systems. The size of QAM constellation can be labeled with M which is equal to $2^K$. For instance, for a bits per symbol parameter k value of k=4, the size of the QAM constellation, i.e. the number of constellation points is $M=2^4=16$. The bits per symbol parameter K can e.g. comprise a value in the range of 2 to 6. One implementation of QAM can use bit interleaved combinations of QAM modulations with different integer values of k, thus resulting in QAM modulations with fractional QAM.

For QAM modulation, parameter k defines the number of bits per symbol and is directly coupled to the constellation size M via expression k=log 2(M), where M isn't necessarily an integer number. For a probabilistically-shaped QAM format, the k value depends on both, a constellation size M and on a coding type, used for probabilistic shaping.

With the method according to the present invention, in a possible embodiment, a signal optical power P of the optical signal transported within the respective optical channel via the optical transmission link OTL can be optimized on the basis of a link generalized optical signal to noise ratio GOSNR. The generalized optical signal to noise ratio GOSNR represents the noise related to impairments of the optical transmission link OTL. The generalized optical signal to noise ratio GOSNR can be defined in a possible embodiment as a ratio between the signal optical power of the optical signal launched by the transmitting transceiver of the optical transmission link OTL into the optical path and the accumulated noise along the optical path of the optical transmission link OTL including amplified spontaneous emission, ASE, noise generated by optical amplifiers represented by a cumulative ASE noise optical power $P_{ASE,link}$, and noise due to fiber nonlinearities NLI accumulated over link spans of the optical transmission link OTL and represented by a cumulative NLI optical power $P_{NLI,link}$.

The generalized optical signal to noise ratio GOSNR is maximized for each link span of the optical transmission link OTL to optimize a signal power of the optical signal transported within the respective optical channel along the optical path of the optical transmission link OTL. A maximum generalized optical signal to noise ratio GOSNR of the optical transmission link OTL can be obtained by a summation over the maximized generalized optical signal to noise ratios GOSNRs over all link spans along the optical path of the respective optical transmission link OTL.

The optical signal to noise ratio OSNR and the generalized OSNR can be defined by a transmission link or optical path as follows:

$$OSNR_{0.1nm, link} = \frac{P_{ch}}{P_{ASE,link}} \quad (1)$$

$$GOSNR_{0.1nm, link} = \frac{P_{ch}}{P_{ASE,link} + P_{NLI,link}} \quad (2)$$

Expression (1) accounts for a single link impairment—amplified spontaneous emission, ASE, noise which can be generated by optical amplifiers and which are represented by a cumulative ASE noise optical power $P_{ASE,link}$, while the expression (2) does account for both major link impairments—ASE noise and noise due to the fiber nonlinearities, accumulated over link spans and represented by $P_{NLI,link}$. Both values depend on the signal optical power $P_{ch}$, launched by the transmitting transceiver into the optical fiber.

The generalized optical signal to noise ratio GOSNR depends on the signal power. If the signal power of the optical signal launched into the optical fiber is low, the nonlinear noise is negligible, and the system performance is mostly limited by ASE. In contrast, at high signal power, performance is limited mostly by a nonlinear noise. An optimum launch signal power P into each optical fiber span exists where the performance of a given signal can be maximized. The optimization can be performed per optical fiber span within the optical transmission link OTL. The optical transmission link OTL can comprise several links or optical spans along its optical signal path connected in series. The optimization can be performed per optical span to account for the fact that in an optical transmission system the span characteristics including a transmission fiber type, span length, span loss, etc. can vary from optical span to optical span.

Figure 11:
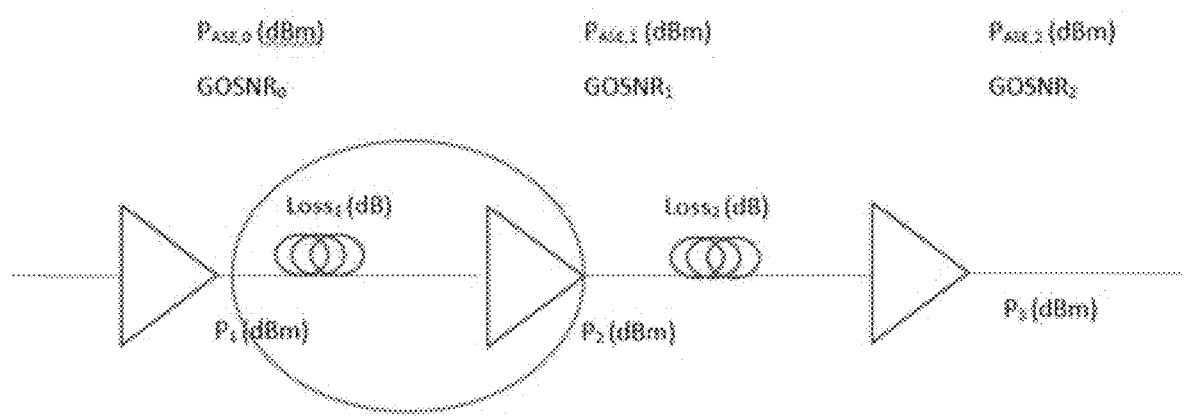
FIG. 11 shows an exemplary optical transmission link with link spans to explain the calculation of a generalized OSNR.

FIG. 11 illustrates an exemplary optical transmission link OTL having several optical spans connected to each other within a WDM system. The GOSNR expression (2) can be rewritten as follows:

$$\frac{1}{GOSNR_i} = \frac{1}{OSNR_i} + VAR_{NLI_i} = \frac{1}{OSNR_i} + \eta_i P_i^2 \quad (3)$$

It is of note that the span $OSNR_i$ and $GOSNR_i$ are not link accumulated values but do result only from a single $i_{th}$-span.

The span $GOSNR_i$ can be defined as the output of the $i_{th}$-span and is written for convenience in the inverse form. It depends on the signal power $P_i$ of the optical signal launched into the respective optical span fiber.

The span nonlinear efficiency $\eta_i$ of equation (3) is computed according to a Gaussian noise GN model and does depend on fiber span characteristics, a system channel plan as well as the coherent transceiver symbol rate.

Further, the span ASE power $P_{ASE,i}$ can be defined by a standard expression and depends on a span EDFA noise figure NF(dB) value and can be assumed for simplicity to be constant:

$$P_{ase,i}(dBm) = G_i(dB) + NF_i(dB) - 57.9 \quad (4)$$

The GOSNR expression (3) can be simplified to:

$$\frac{1}{GOSNR_i} = \frac{NF_i 10^{-8.79}}{P_i Loss_i} + \eta_i P_i^2 \quad (5)$$

wherein $Loss_i$ is a fiber span loss in the $i_{th}$-span. By differentiating 1/GOSNR with respect to a signal power and by equating the result to 0, one can get for the optimal value of the signal power as follows:

$$\frac{2\eta_i P_i^3 Loss_i}{10^{-8.79} NF_i} = 1 \quad (6)$$

The corresponding amplifier optimal gain can be defined as:

$$G_i = \frac{P_{max\_per\_ch,i}}{P_i Loss_i} \quad (7)$$

By inserting optimal power and optimal span gain into the GOSNR expression (3), one reaches the target, i.e. one gets the maximum value of GOSNR per span MAX $GOSNR_i$. Link MAX $GOSNR_{link}$ of the whole optical transmission link OTL can be obtained by the summation over all spans as follows:

$$\frac{1}{MAX\ GOSNR_{link}} = \sum_{i=1}^{N_s} \frac{1}{MAX\ GOSNR_i} \quad (8)$$

The span nonlinear efficiency $\eta_i$ used in expressions (3) and (5) can be defined as follows:

$$\eta_i = B_n \left(\frac{2.0}{3.0}\right)^3 \frac{\gamma^2 (1/R_s^3) L_{eff}^2}{\pi |\beta_2| L_{eff,a}} \operatorname{asinh}\left(\frac{\pi^2}{2} |\beta_2| L_{eff,a} R_s^2 N_{ch}^{2\frac{R_s}{\Delta f}}\right) \quad (9)$$

The span nonlinear efficiency $\eta_i$ having an impact of the GOSNR depends on the modulated signal symbol rate value $R_s$, and the channel count $N_{ch}$. The span nonlinear efficiency is scaled to the bandwidth $B_n$ which can be e.g. 12.5 GHz (0.1 nm).

Further, the span nonlinear efficiency does depend on the channel slot frequency range $\Delta f$ as indicated in equation (9). Further, the span nonlinear efficiency $\eta_i$ does depend on a transmission fiber attenuation $\alpha$ for the signal electromagnetic wave, which is related to the fiber loss $\alpha_{dB}$ for signal power used in engineering as:

$$\alpha = \alpha_{dB} * 0.05 * ln(10) \quad (10)$$

The span nonlinear efficiency $\eta_i$ does also depend on the effective loss length $L_{eff}$ where $L_s$ is a span length of the respective optical span:

$$L_{eff} = \frac{1 - e^{-2\alpha L_s}}{2\alpha} \quad (11)$$

The asymptotic effective loss length $L_{eff,a}$ of equation (9) is given by:

$$L_{eff,a} = \frac{1}{2\alpha} \quad (12)$$

Further, the span nonlinear efficiency $\eta_i$ does depend on a fiber group velocity dispersion parameter $\beta_2$ which is related to a fiber dispersion parameter D used in engineering as:

$$\beta_2 = -\frac{\lambda^2 D}{2\pi c} \quad (13)$$

Further, the span nonlinear efficiency $\eta_i$ does depend on a fiber nonlinear coefficient $\gamma$. It is of note that the span nonlinear efficiency $\eta_i$ does not depend on the signal power P. The function asinh of equation (9) is the inverse hyperbolic sine function.

Accordingly, it is possible to calculate a generalized OSNR (GOSNR) per each optical span and then to perform a summation over all optical spans.

In a further embodiment of the computer-implemented method according to the first aspect of the present invention, a link effective bandwidth BW of the optical transmission link OTL is calculated which does represent the passband filtering related impairments caused by optical filters provided along the optical path of the optical transmission link OTL. The link effective bandwidth BW of the optical transmission link OTL can be calculated by multiplying filter functions of link cascaded wavelength-selective switch modules and/or optical filters provided along the optical path of the respective optical transmission link OTL. The link effective optical band-width BW can be either more or less than a symbol rate value. If it is more than the symbol rate SR then the channel filtering penalty is weak. In the opposite case, i.e. if the link effective optical bandwidth BW is less than the symbol rate SR the channel filtering penalty might be significant.

The bandwidth calculation, in particular for a ROADM-based link, can be done by multiplying filter functions of link cascaded WSS modules. A filter function of a separate WSS module is based on an analytical approach. The WSS transmittance formula is given by:

$$S(f) = \frac{1}{2} \sigma \sqrt{2\pi} \left[ \operatorname{erf}\left(\frac{\frac{B}{2} - f}{\sqrt{2}\sigma}\right) - \operatorname{erf}\left(\frac{-\frac{B}{2} - f}{\sqrt{2}\sigma}\right) \right] \quad (14)$$

wherein $$\sigma = \frac{BW_{OTF}}{2\sqrt{2\ln 2}} \quad (15)$$

wherein the optical power spectrum of the bandpass filter for WSS can be computed by a squaring expression (14) and converting it to decibels.

The width of a rectangular aperture in frequency (B) does correspond to a channel frequency slot assigned to the respective optical channel. An optical transfer function band-width ($BW_{OTF}$) is used to parametrize the sharpness of the filter edges. The values for both parameters B and $BW_{OTF}$ can be estimated based on a larger measurement data set for a specific module type per supplier. The link effective full optical WDM channel bandwidth value can comprise a value of 3 dB, 6 dB or other level below peak. One can choose for instance a 6 dB level.

The system performance parameter or metric Q of the optical WDM transmission system can depend on the link effective bandwidth BW of the optical transmission link OTL representing the passband filtering-related impairments of the optical transmission link OTL and which depends on the generalized optical signal to noise ratio GOSNR representing the noise related impairments of the optical transmission link OTL. The system performance parameter Q can be optimized iteratively until a calculated channel margin CM of the optical channel is equal or larger than a preset channel margin target. The squared system performance parameter $Q^2$ of the optical WDM transmission system can be defined as follows:

$$Q^2 = \frac{1}{\frac{1}{GOSNR_{0.1nm}} \frac{BW_{rx,el}}{B_n} + \sigma_{trx}^2 + \sigma_{PB}^2} \frac{3}{M-1} \quad (16)$$

The denominator of the expression (16) comprises a linear sum of noise variances, responsible for various impairments. Based on found characterization results, a receiver double-sided effective electrical bandwidth $BW_{rx,el}$ (measured in Hz) and a transceiver noise variance $\sigma_{trx}^2$ (normalized) do scale linearly with a signal symbol rate SR (measured in Hz). In addition to that, in practical devices, the scaling coefficients comprise a weak linear dependency on the bits per symbol parameter K, which are device-specific.

$BW_{rx,el}$(Hz)==Linear function of variables k and SR,function coefficients are device specific (17)

$\sigma_{trx}^2$(normalized)==Linear function of variables k and SR,function coefficients are device specific (18)

The expression for the passband filtering noise variance (normalized) due to the ROADMs can have the following exponential expression based on a lab characterization:

$$\sigma_{PB}^2(\text{normalized}) = A * \text{EXP}[B*(\text{BW}_{6\,dB}-\text{SR})], \quad (19)$$

wherein A and B coefficients are device specific and can depend on the bits per symbol parameter K:

$$A = \text{positive-valued function of the variable } k \quad (20)$$

$$B = \text{negative-valued function of the variable } k \quad (21)$$

The objective of lab characterization is to estimate optical filtering penalty for a coherent transceiver, where link optical filtering is emulated by using a programmable filtering module and link OSNR is emulated by using optical noise source module. The penalty metric can be a signal OSNR, system parameter Q, or some other system performance parameter.

Lab characterization can be done separately
a) for every type of coherent transceiver, as their filtering response depends on specifics of the coherent transceiver implementation
b) for a two-dimensional grid of (SR, k) values.

By fitting phenomenological penalty data, one comes up for the pass-band noise variance with the exponential dependence (19) on the difference between link effective bandwidth and signal symbol-rate SR and expressions (20-21) for positive-valued function A(k) and negative-valued-function B(k).

Figure 6:
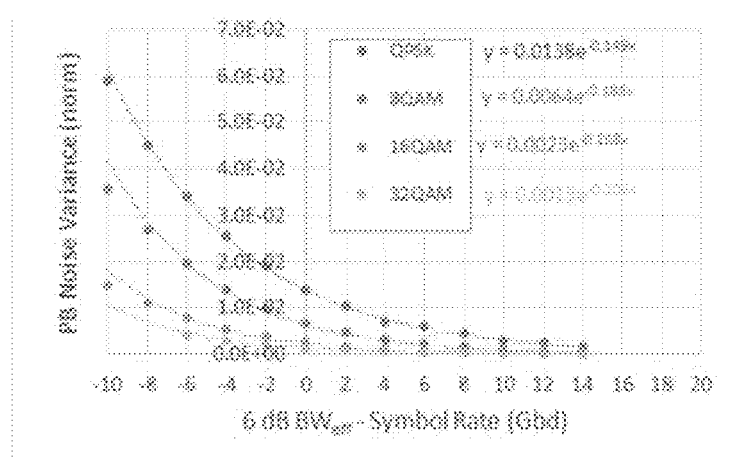
FIG. 6 illustrates a coherent transceiver back-to-back characterization result summary as the function of two variables: parameter k (bit/symbol) and the difference between link effective optical bandwidth and signal symbol rate, with all other signal performance affecting parameters fixed.

FIG. 6 provides an example of the lab characterization for the pass-band noise variance for several values of parameter k: QPSK (k=2), 8 QAM (k=3), 16 QAM (k=4), and 32 QAM (k=5) of some coherent transceiver. By fitting the curves of FIG. 6, one estimates expressions (20-21) for functions (A(k) and B(k)). As soon as B becomes a negative valued function of parameter k, pass-band penalty and corresponding noise variance starts to increase as soon as the signal symbol-rate SR exceeds a link optical bandwidth value. The above expressions (19-21) are one step away from being a complete set to be used for a channel capacity maximization procedure. One requires an additional expression for channel margin, CM, calculation as follows:

$$\text{Channel margin(dB)} = Q^2(\text{dB}) - \text{FEC\_Threshold\_}Q^2(\text{dB}) \quad (22)$$

The channel margin CM of the optical channel can be measured in decibels. The FEC_Threshold_$Q^2$(dB) depends on the FEC type and details of the transceiver implementation and transceiver settings.

For error-free performance, the channel margin CM should be equal to zero or positive:

$$\text{Channel margin(dB)} \geq 0 \quad (23)$$

When the channel margin CM preset target is used, expression (23) can be replaced with:

$$\text{Channel margin(dB)} \geq \text{preset channel margin target} \quad (24)$$

The channel margin CM is the difference between a channel current performance metric and its lowest value which corresponds to an error-free target. In a possible embodiment, a channel Q margin is used which can be defined as the difference between the current pre-FEC $Q^2$(dB) and its minimal value required for error-free transmission. For example, the current pre-FEC $Q^2$(dB)=8.0 and the minimal target for error-free transmission pre-FEC $Q^2$(dB)=5.0. In this example, the channel margin CM is 3.0 dB=8.0-5.0 dB.

The computer-implemented method according to the present invention can optimize the channel margin CM of the optical channel iteratively until the calculated channel margin CM is equal or larger than a preset channel margin target. The channel margin CM of the optical channel can be calculated based on a predefined system performance parameter Q. This performance parameter Q depends on the signal symbol rate SR and the bits per symbol parameter K of the used modulation format. The system performance parameter Q is in a preferred embodiment a derivative of a measurable bit error ratio BER. The bit error ratio BER can be measured for the respective optical channel. In terms of measurement, the system performance parameter Q can be a derivative of BER as follows:

$$Q = \sqrt{2}\,\text{erfcinv}(2\,\text{BER}) \quad (25)$$

wherein erfcinv is the inverse complimentary error function. The smaller the BER value, the higher is the corresponding Q-parameter value. For example, for a post-FEC BER target value of $10^{-15}$, the corresponding Q-value of the system performance parameter Q is 7.9. In terms of modeling, either one of the variables Q or BER can be used in a preferred embodiment, the system performance parameter Q implies a pre-FEC Q-value.

A receiver pre-FEC bit error ratio, BER, corresponds to a BER before or without FEC processing at the receiver. The receiver post-FEC BER corresponds to a BER after FEC processing at the receiver. A transmission system can be defined as being error-free, if the post-FEC BER is 10^(-15) or less.

The optical signal transported within the optical channel along the optical transmission link OTL comprises a digital bit stream. In a preferred embodiment, a forward error correction FEC overhead OH is added to the digital bit stream transmitted by the transmitting receiver via the optical transmission link OTL to the receiving transceiver to provide an FEC functionality at the receiving transceiver. In a possible embodiment, the bit error ratio BER of an optical channel is measured at the receiving transceiver of the optical transmission link OTL before the forward error correction FEC processing to derive the system performance parameter Pre FEC Q of the WDM transmission system for the respective optical transmission link OTL used for providing a maximum channel capacity for the respective optical channel. The forward error correction FEC uses an algorithm that can help to identify and correct for errors in the received bit stream. Correction capabilities depend on the FEC type. There are two variants of BER values, i.e. a pre-FEC and a post-FEC value. In a preferred embodiment, the pre-FEC BER value is used. The FEC overhead OH comprises extra bits added to the transmitted bit stream to support the FEC functionality. The FEC OH can range in a possible implementation from 7% to about 27% depending on the FEC gain and/or application type. The FEC gain comprises a performance gain, i.e. a difference between pre- and post-FEC performance metric values. Different metrics can be used to measure FEC gain including BER, OSNR or $Q^2$(dB). In a typical transmission system equipment, a coherent transceiver card with 27% FEC OH can improve the input pre-FEC BER=3.7E−2 to the error-free target of $10^{-15}$. In terms of a system parameter $Q^2$(dB), the FEC gain can comprise 13 dB, as input pre-FEC value of 5.0 dB increases to a post-FEC value of 18.0 dB.

The computer-implemented method for providing a maximum channel capacity per optical channel in an optical wavelength division multiplexing, WDM, transmission system can be implemented in a planning or a design phase of a WDM network deployment or it may be implemented as part of a turn-up optimization procedure in a field-deployed WDM system.

Figure 4:
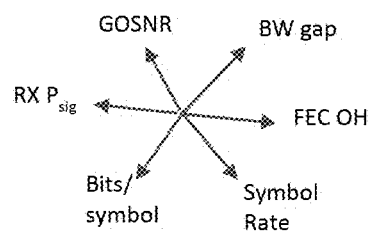
FIG. 4 illustrates a parameter modeling space which can be used by a computer-implemented method according to the present invention.

In general, a modeling of a link system performance parameter Q can be done in a 6D-space as also illustrated in FIG. 4. The 6D parameter modeling space may comprise the generalized optical signal noise ratio GOSNR, a receiver signal power (RX $P_{sig}$), the bits per symbol parameter K of the modulation format, the signal symbol rate SR, the forward error correction FEC overhead FEC OH and the bandwidth gap $BW_{gap}$.

The generalized optical signal to noise ratio GOSNR can comprise a continuous variable in a range that does support error-free transmission. The GOSNR value can depend on specifics of a link configuration and chosen optimization process. The signal link OSNR and nonlinear impairments can be folded into the GOSNR.

The received signal power RX $P_{sig}$ comprises a variable value that can be chosen within the range that supports error-free transmission. The bits per symbol parameter K can be either discrete or a continuous variable depending on a practical device implementation. For example, for QAM modulation, the corresponding range for the bits per symbol parameter K is in a range from 2 to 6 for the latest generation coherent transceivers and may reach higher values. For a corresponding QAM constellation size M, the constellation size is defined as $M=2^K$.

The signal symbol rate SR can also comprise either a discrete or continuous variable depending on a practical device implementation. The overall channel capacity is determined by the signal symbol rate SR and the bits per symbol parameter K, along with FEC and other overhead added to the signal symbol rate SR.

The forward error correction FEC overhead OH variable is a discrete variable.

Passband (PB) filtering impairment can be expressed as the function of a link effective optical bandwidth BW and can also be treated as an equivalent noise, approximated with a Gaussian distribution, hence, like ASE noise and nonlinear noise. A link effective full optical WDM channel bandwidth value can be defined at 3 dB, 6 dB or other level below peak. For instance, the link effective full optical WDM channel bandwidth value can comprise a 6 dB level.

The bandwidth gap $BW_{gap}$ can be defined as the difference between the link effective full optical bandwidth and the symbol rate SR.

$$BW_{gap} = BW_{6\,dB} - \text{signal symbol rate SR} \quad (26)$$

The bandwidth gap $BW_{gap}$ can be used to account for link passband filtering penalty. The 6 dB bandwidth can be computed by using optical link configuration and characteristics of optical modules which do limit the signal optical bandwidth, for example ROADMs and AWGs.

As soon as line and transceiver impairments are treated as additive independent Gaussian noise, the system parameter $Q^2$ squared can be calculated as indicated in equation (16) above.

A denominator of the squared system performance parameter $Q^2$ is a sum of noise variances responsible for various types of impairments. These impairments include ASE noise and nonlinear noise, transceiver noise variances and passband noise variances. The value of the GOSNR can be scaled for instance with a standard 0.1 nm (12.5 GHz) bandwidth $B_n$ and can be maximized according to conventional optimization methods. A transceiver effective electrical bandwidth is labeled as $B_{rx,el}$. The transceiver effective electrical bandwidth allows to lump electrical filtering characteristics of all receiver components into a single parameter. A specific value of the transceiver effective electrical bandwidth depends on the transceiver modulation format and symbol rate SR. Roughly speaking, the value of the transceiver effective electrical bandwidth is close to the signal symbol rate SR. Receiver sensitivity, crosstalk, polarization-dependent loss and other transmission and transceiver impairments can be included as noise terms in the expression (16) in a signal optimization procedure.

Figure 2:
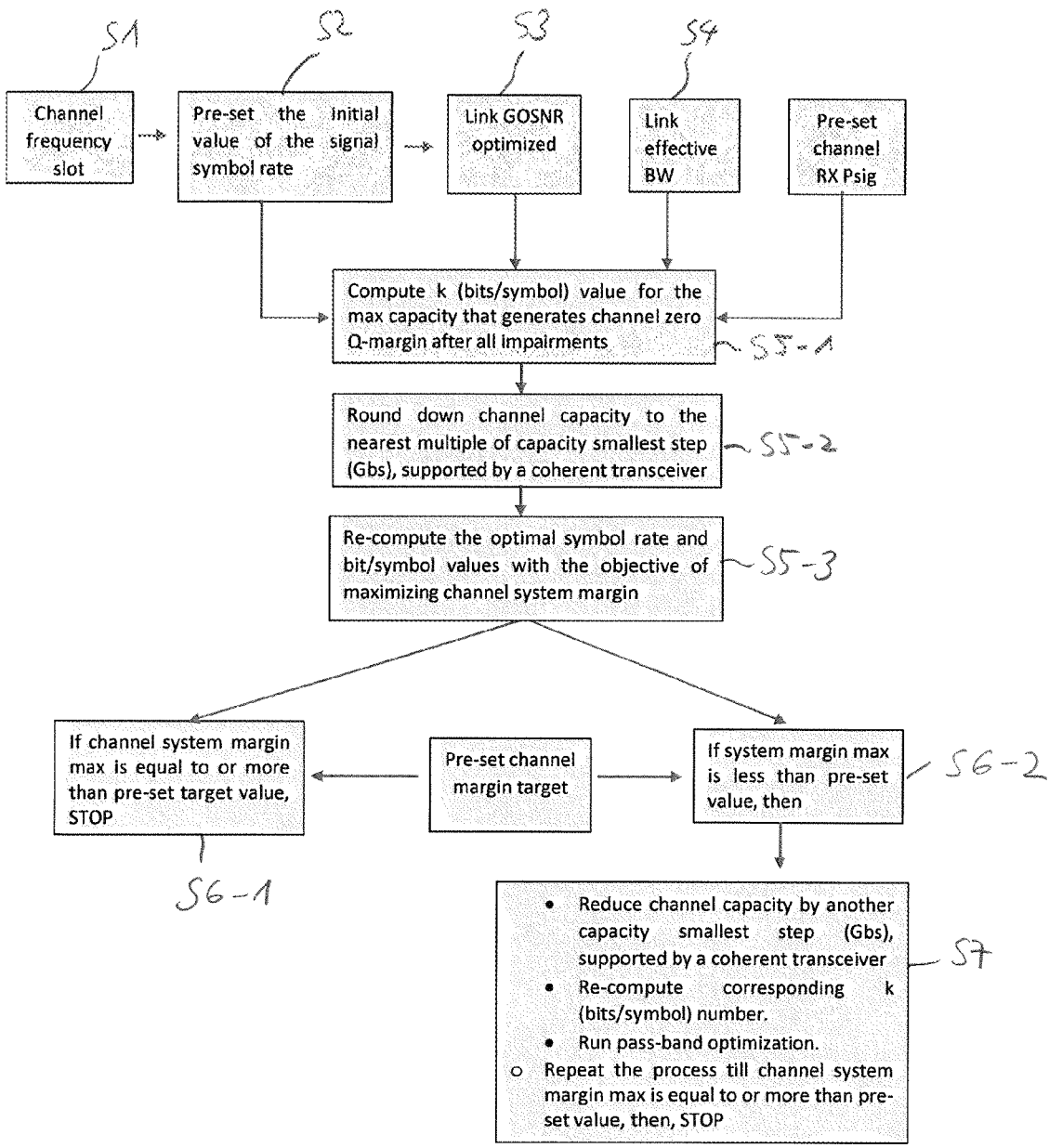
FIG. 2 shows a diagram for illustrating a possible exemplary embodiment of a channel performance optimization procedure performed by a wavelength division multiplexing, WDM, system design tool used for planning a wavelength division multiplexing, WDM, system such as the WDM system illustrated in FIG. 1 during system design.

FIG. 2 shows a diagram for illustrating a channel performance optimization procedure using the method according to the present invention during system design of a WDM transmission system.

In the illustrated implementation, in a first step S1, a channel frequency slot Δf is preset. The channel frequency slot Δf is defined as the frequency range in the optical spectrum allocated to the optical channel but not necessarily filled by the optical channel.

In a further step S2, the initial value (zero-order approximation) $SR_0$ of the signal symbol rate SR is set. In a possible embodiment, the setting can be done based on a preset channel guard band defined as the difference between the channel frequency slot Δf and the signal symbol rate SR. For example, if the channel frequency slot Δf=75 GHz and the channel guard band is equal to 5.56 GHz, then the signal symbol rate initial value $SR_0$=69.44 GBd. The channel guard band value can be preset based on practical knowledge and it is desirable to keep it small to get a most efficient bandwidth use.

In a further step S3, line optimization is performed where the signal power is optimized. In this step, the generalized OSNR (GOSNR) of the optical transmission link OTL is maximized. For computation, one can use zero-order approximation $SR_0$ from the previous step for the symbol rate SR. Once the modulation format and symbol value optimizations have been completed, one can revisit step S3. Step S3 can be done outside the coherent transceiver performance optimization method. Accordingly, step S3 comprises an optional step as it is also possible to use a non-optimized link GOSNR value and perform channel capacity optimization.

In a further step S4, link effective bandwidth can be pre-calculated separately by multiplying the filter shapes of the ROADMs or fixed OADMs along the signal path of the optical transmission link OTL. This link effective bandwidth BW can be expressed at 3 dB, 6 dB, or other value below the transmittance peak. This may also include the effects of relative center frequency offsets between the ROADM/OADM filter shapes as well as the relative frequency offset between a channel and the product of the ROADM/OADM filter shapes.

In further steps S5, coherent transceiver optimization is performed. This can be done using the expressions (16) to (24) indicated above. The expressions (16) to (22) can be run in the full range of k-values supported by a coherent transceiver. Then, the max k-value ($k_0$, zero-order approximation) with zero channel Q-margin can be computed in step S5-1 (see expression (23)). The computed k-value defines the channel maximum capacity. The symbol rate SR is kept at its initial value during this step. At the end of step S5-1, one has both values $SR_0$, $k_0$ per symbol rate and bits per symbol with zero system margins after taking into account all impairments.

In a further step S5-2, the channel capacity is reduced down to the nearest capacity supported by the coherent transceiver. And then, a corresponding reduced k-number is computed while maintaining the symbol rate value $SR_0$. The optimal symbol rate and bit per symbol value is recomputed with the objective maximizing the channel system margin CM by achieving a good trade-off between the two impairments, i.e. noise-related impairments and the passband filtering-related impairments.

During the optimization, the channel capacity is kept at the same level. If the computed system margin CM is equal or more than the preset margin target, the procedure is stopped in Step S6-1 as illustrated in FIG. 2. In contrast, if the channel margin CM found in step S6-2 to be less than the preset target value, then the previous optimization steps are repeated. The channel capacity is reduced in step S7 by another smallest step (Gb/s), supported by the coherent transceiver and the optimization is run until the channel margin CM is equal or more than the preset target margin. If this is achieved the procedure is stopped as illustrated in FIG. 2.

The channel capacity of an optical channel is the information rate supported by the data channel. The channel capacity can for instance range from 100 Gb/s to 600 Gb/s. The channel capacity smallest step can be for instance 50 Gb/s.

The output of the procedure illustrated in FIG. 2 is the signal symbol rate SR and the bits per symbol k-values that provide the maximum capacity per optical channel with a channel margin CM equal or larger than the preset target. The generalized OSNR of the optical link provided as input can be either set or optimized itself in step S3.

FIG. 8 shows a Table and an example for a fixed GOSNR. In the example, the channel slot is set at 75 GHz with a FEC overhead OH of 27%. A channel margin target of 1 dBQ is chosen. The zero-order approximation for the signal symbol rate SR is pre-set to 69.44 GBd. In the illustrated example of the Table shown in FIG. 8, the link GOSNR is 21 dB/0.1 nm and the channel capacity step is 50 Gbs. The maximum channel capacity under optimization is achieved to be 350 Gb/s. Accordingly, after performing the optimization procedure, an optimum maximum capacity per optical channel is 350 Gb/s under the given conditions.

After switching off the symbol rate SR and bits per symbol variable tunability in the test case as illustrated in FIG. 8, the optimization algorithm does result in 50 Gb/s less capacity per optical channel under the same conditions as also illustrated in the Table shown in FIG. 9. As can be seen from the Table of FIG. 9, the maximum channel capacity of the optical channel is reduced to 300 Gb/s in case that the symbol rate SR and bits per symbol variable tunability has been switched off.

FIG. 10 shows a Table to illustrate optimization results wherein a GOSNR sweep is performed, i.e. where the GOSNR is fixed at different levels. Accordingly, the table of FIG. 10 illustrates the optimization results for scenarios with the same effective link bandwidth but with different link channel GOSNR ranging from 15 dB/0.1 nm to 37 dB/0.1 nm. In the illustrated example, the FEC overhead OH of 27% is used with a link bandwidth of 64.44 GHz assuming a channel capacity step of 50 Gb/s. The results shown in FIG. 8 represent a special case of FIG. 10 with the signal link GOSNR being set at 21 dB/0.1 nm.

Figure 3:
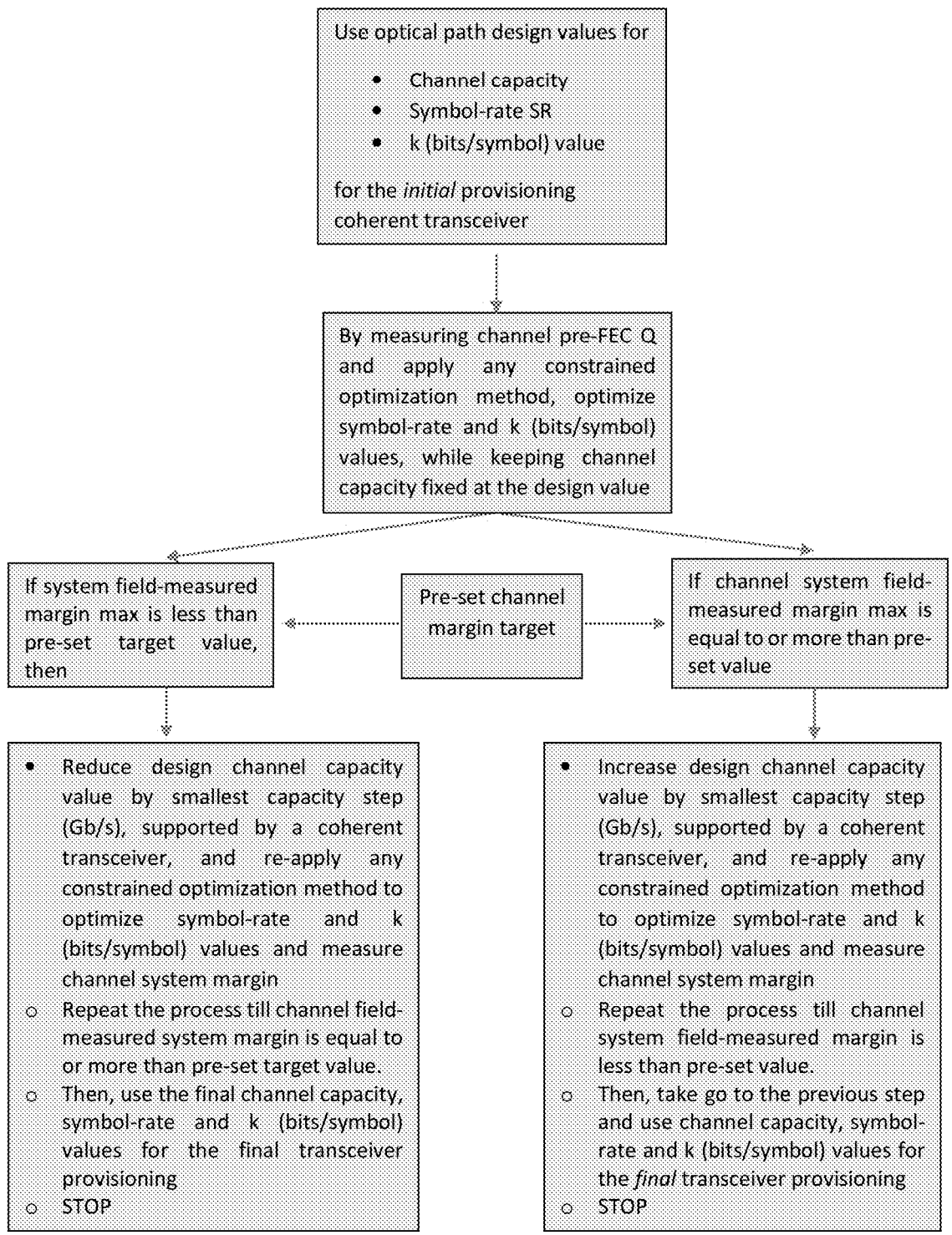
FIG. 3 shows a diagram of a channel performance optimization procedure performed for an optical WDM transmission system deployed in the field.

FIG. 3 shows a diagram to illustrate a channel performance optimization procedure for a WDM transmission system deployed in the field. In this embodiment, the channel margin CM of the optical channel is optimized to provide a maximum channel capacity during a turn-up procedure to establish the optical channel within the optical transmission link OTL in the optical WDM transmission system deployed in the field.

During a link turn-up or commissioning procedure, one can use output results of the procedure used in the network design phase (FIG. 2) as a starting point. Then, it is possible to improve the optimization process effectiveness by compensating issues that limit the accuracy of the optimization procedure during the network planning phase.

A modeling value for link GOSNR data can be based on span loss data, provided by a carrier to a system vendor design engineer during a link design stage, which is typically an approximation in terms of fiber attenuation and span lengths. The actual span data can impact link GOSNR value and the channel capacity optimization results.

The computation of channel system margins CM is usually done for a worst case of the manufacturing distribution for transceivers. In an actual existing link, coherent transceiver performance can be in a range between the worst and a best-performing case. This factor does also impact channel capacity optimization results.

In the diagram illustrated in FIG. 3 with an initial provisioning of a coherent transceiver, one can start the design values for a maximum channel capacity, an optimal symbol rate SR and an optimal k (bits/symbol) value.

Then, one can use any constrained optimization method for further performance optimization as indicated in the diagram. Constrained optimization methods can comprise two major features. Optimization can be done by blind scanning of the SR, k 2D-space. Further, the optimization process can be constrained as the scanning in (SR, k) 2D-space is done at the fixed value of the channel capacity.

As illustrated in FIG. 3, after having performed the initial provisioning of the coherent transceiver with the start values, in a further step, a channel pre-FEC system performance parameter Q is measured, and a constrained optimization method is applied to optimize the signal symbol rate SR and the k (bit/symbol) values while keeping the channel capacity fixed at a design value.

If the system field-measured channel margin CM is less than a preset target value, then the design channel capacity value is reduced by a smallest capacity step (Gb/s), supported by the coherent transceiver, and the constrained optimization method is reapplied to optimize the symbol rate SR and the k (bits/symbol) values to measure the channel system margin again. This process is repeated until the channel field-measured system margin is equal to or greater than the preset target value. Then, the final channel capacity symbol rate SR and k (bits/symbol) values for the final transceiver provisioning is used. Then, the procedure is stopped.

In contrast, if the channel system field-measured channel margin maximum is equal to or more than the preset value, the design channel capacity value is increased by the smallest capacity step (Gb/s), supported by a coherent transceiver and the constrained optimization method is reapplied to optimize the signal symbol rate SR and the k-values. Then, the channel system margin is measured again. The process is repeated until the channel system field-measured margin is less than the preset value. Then, the channel capacity, signal symbol rate SR and k-values for the final transceiver provisioning are used and the procedure is stopped.

Figure 5:
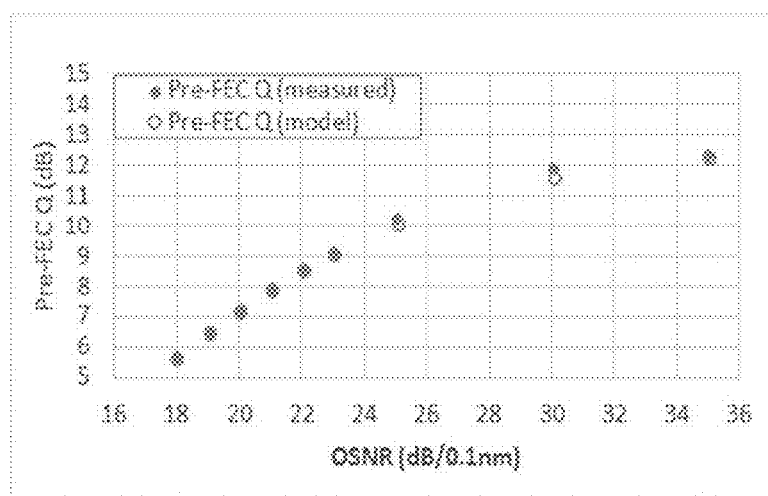
FIG. 5 shows a diagram to illustrate a back-to-back characterization of a coherent transceiver as the function of signal link OSNR, with all other performance affecting system parameters fixed.

To provide a channel accurate model as indicated in equation (16) based on an analytical noise approach, a transceiver characterization is required, as not all variables in the model of equation (16) can be computed accurately. Accordingly, laboratory characterization compliments the analytical model with phenomenological data and can help to achieve high modeling accuracy while keeping its simplicity. An example of a Back-to-Back characterization procedure is given in FIG. 5 with a fixed FEC overhead FEC OH, fixed values for bits per symbol and symbol rate SR, where signal link OSNR is emulated by using optical noise source module and the signal OSNR has been swept in a broad range. Based on the characterization data fit, it is possible to estimate the transceiver effective electrical bandwidth $B_{rx,el}$ and the transceiver noise variance $\sigma_{trx}^2$. The lab characterization does help to remove an oversimplifying assumption that the transceiver effective electrical bandwidth is equal to the symbol rate SR.

Similarly, a characterization can be done for all other important impairments including in particular passband filtering as illustrated in the diagram of FIG. 6.

Further, a characterization can be done for bits per symbol and symbol rate SR in a range supported by a particular type of coherent transceiver. A receiver effective bandwidth, transceiver noise variance and receiver thermal noise variance scale with a signal symbol rate SR as linear functions. In addition to that in practical devices, the scaling coefficients for receiver effective bandwidth and transceiver noise can show in turn a weak linear dependency on the signal k (bits/symbol) parameter.

Accounting for passband filtering (PB) impairments as an additive noise term helps to analyze the trade-off between GOSNR-related penalty and passband filtering penalty for a channel with a fixed channel capacity.

Figure 7:
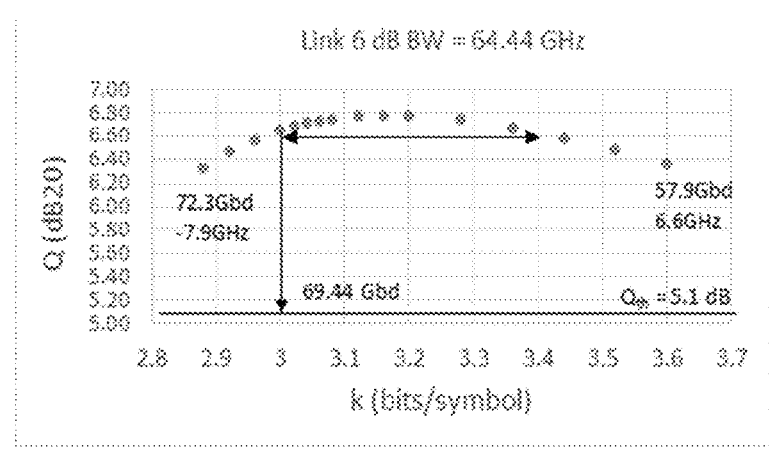
FIG. 7 shows a further diagram for illustrating a signal performance trade-off between the signal symbol-rate and parameters k(bit/symbol)

FIG. 7 represents an example for such a trade-off for a 300G channel with a signal GOSNR=20 dB/0.1 nm and a link $BW_{6\ dB}$=64.44 GHz. At the fixed channel rate and fixed GOSNR, a high bits per symbol value k increases the spectral efficiency but does deteriorate the signal quality which can be measured as a bit error ratio BER, a system performance parameter Q and/or electrical signal to noise ratio SNR, etc. as the distance between constellation points of the modulation format is getting smaller and the tolerance to noise is decreasing. Low values of bits/symbol-variable result in a higher symbol rate SR, higher passband impairment and to deteriorate again signal quality. Achieving the optimal trade-off between the two impairments forms a goal for optimization of the transceiver characteristics. While the starting sweep point can be an integer value of k=3, the optimal k-value with the maximum system performance parameter Q value is about 3.2 as can be seen from FIG. 7.

With the method according to the present invention, it is possible to operate a WDM system with software-defined coherent transceivers subject to bandwidth constraints caused by ROADMs or other optical filters. All impairments including filter penalties are included in a generalized OSNR performance metric and a signal symbol rate SR and the modulation format are optimized to maximize the generalized OSNR and thereby to achieve a maximum channel capacity for the respective optical channel.

A significant advantage of the computer-implemented method according to the present invention resides in the ability of the WDM system with ROADMs and with software-defined transceivers to reach a maximum transmission capacity per optical channel. Alternatively, the method according to the present invention can be used to maximize the available operating margin as measured by known transmission performance indicators or metrics such as BER, Q-factor or SNR. Another advantage offered by the method according to the present invention is the reduced complexity of the required calculations which does translate to lower times required to achieve optimum settings for a given optical channel and for all signals transported in the optical network. Another advantage of the method according to the present invention resides in the generality of the method and of the WDM system applicable to a range of transceivers or transponders with settable bits per symbol parameters k and signal symbol rates SR (time-interleaved modulation formats, probabilistically shaped signals or signals with multiple subcarriers). Different transceiver implementations and modulation techniques can result in varying "effective" bits per symbol (k) value. In some techniques, including both subcarrier multiplexing and time-interleaved modulation, it may be that only integer k values are used for each subcarrier or each time-slot, but this does result in an "effective" k value for the aggregate signal which is not an integer.

The invention provides a computationally efficient calculation procedure to determine optimum channel settings of a software-defined transceiver, wherein a net bandwidth calculation of a ROADM sequence on a WDM optical link is used. This can be achieved by maximizing a generalized OSNR, which does include an equivalent passband noise dependent on link net bandwidth and transceiver settings.

The method according to the present invention can be applied to a WDM link using software-defined transceivers (with an adjustable signal symbol rate SR, modulation index and FEC type) subject to constraints from ROADMs or fixed optical add/drop filters along the optical link. The method according to the present invention uses a concept of a net bandwidth to characterize the filtering characteristics of the optical link which may include one or more ROADMs or other optical add/drop filters, thus reducing the complexity of a sequence of multiple different filters to a relevant bandwidth value. The impact of different bandwidth values on signals of different signal symbol rates SR and modulation formats is considered by the method according to the present invention. Transmission penalties caused by spectral filtering on signals are converted into a noise variance. Further, an extended concept of generalized OSNR is deployed which includes filter noise besides the ASE noise and nonlinear noise used in a standard definition of GOSNR. With the method according to the present invention, a GOSNR can be maximized as a function of the signal symbol rate SR and a modulation index of the employed modulation format. Further, the maximum channel capacity for a channel transmitted over a given optical transmission link passing through a given sequence of optical filters or ROADMs can be determined using the computer-implemented method according to the present invention.

What is claimed is:

1. A method for providing a maximum channel capacity per optical channel in an optical wavelength division multiplexing, WDM, transmission system, the method comprising:

transmitting, from a transmitting transceiver via an optical transmission link, OTL, including at least one Reconfigurable Optical Add Drop Multiplexer, ROADM, or another optical filter to a receiving transceiver and using multiple optical channels in a WDM channel grid to transport optical signals modulated with a modulation format and with a signal symbol rate, SR; and maximizing, by a controller operatively associated with the transmitting transceiver and the receiving transceiver, a channel capacity of the optical channel while maintaining a calculated channel margin, CM, above a preset minimal channel margin value by iteratively optimizing a system performance parameter, Q, of the optical WDM transmission system, which depends on a link effective bandwidth, BW, of the optical transmission link, OTL, representing the passband-filtering related impairments of the optical transmission link, OTL, and which depends on a generalized optical signal noise ratio, GOSNR, representing the noise related impairments of the optical transmission link, OTL, until the calculated channel margin, CM, is equal or larger than the preset minimal channel margin value.

2. The method according to claim 1 wherein the system performance parameter, Q, of the WDM transmission system comprises a derivative of a bit error ratio, BER, or a derivative of another performance metric, including in particular a pre-FEC BER or a Signal-to-Noise Ratio, SNR, measured for the respective optical channel.

3. The method according to claim 1 wherein the optical signal transported within the optical channel via the optical transmission link, OTL, is modulated with a quadrature amplitude modulation, QAM, format or with a probabilistically-shaped QAM format.

4. The method according to claim 1 wherein a signal optical power, P, of the optical signal transported within the respective optical channel via the optical transmission link, OTL, is optimized on the basis of the generalized optical signal noise ratio, GOSNR, wherein the generalized optical signal noise ratio, GOSNR, representing the noise related impairments of the optical transmission link, OTL, is defined as a ratio between the signal optical power of the optical signal launched by the transmitting transceiver of the optical transmission link, OTL, into the optical path and the accumulated noise along the optical path of the optical transmission link, OTL, including amplified spontaneous emission, ASE, noise generated by optical amplifiers represented by a cumulative ASE optical power, $P_{ASE}$, link, and noise due to fiber nonlinearities, NLI, accumulated over link spans of the optical transmission link, OTL, and represented by a cumulative NLI optical power, $P_{NLI}$, link, wherein the generalized optical signal noise ratio, GOSNR, is maximized for each link span of the optical transmission link, OTL, to optimize the signal power of the optical signal transported within the respective optical channel along the optical path of the optical transmission link, OTL, wherein a maximum generalized optical signal noise ratio of the optical transmission link, OTL, is obtained by summation over the maximized generalized optical signal noise ratios, GOSNR, over all link spans along the optical path of the respective optical transmission link, OTL.

5. The method according to claim 1 wherein the link effective bandwidth, BW, of the optical transmission link, OTL, is calculated by multiplying filter functions of link cascaded WSS modules and/or optical filters provided along the optical path of the respective optical transmission link, OTL.

6. The method according to claim 1 wherein an initial value, $SR_0$, of the signal symbol rate, SR, of the optical signal transported within the optical channel via the optical transmission link, OTL, is preset and used to maximize the channel capacity of the optical channel.

7. The method according to claim 1 wherein a channel frequency slot, $\Delta f$, forming a frequency spectrum range assigned to an optical channel in the WDM channel grid of the WDM transmission system is preset.

8. The method according to claim 7 wherein the initial value, $SR_0$, of the signal symbol rate, SR, is set based on a preset channel guard band defined as the difference between the channel frequency slot and the signal symbol rate, SR.

9. The method according to claim 1 wherein the channel capacity of the optical channel is maximized to provide a maximum channel capacity during a design phase where the optical WDM transmission system is planned or wherein the channel capacity of the optical channel is maximized to provide a maximum channel capacity during a turn-up procedure to establish the optical channel via the optical transmission link, OTL, in the optical WDM transmission system deployed in the field.

10. The method according to claim 1 wherein the optical signal transported within the optical channel along the optical transmission link, OTL, comprises a digital bit stream.

11. The method according to claim 10 wherein a forward error correction, FEC, overhead, OH, is added at the transmitting transceiver to the digital bit stream which is transmitted by the transmitting transceiver via the optical transmission link, OTL, to a receiving transceiver to provide FEC functionality at the receiving transceiver.

12. The method according to claim 11 wherein the bit error ratio, pre-FEC BER, of an optical channel is measured at the receiving transceiver of the optical transmission link, OTL, before forward error correction, FEC, processing to derive the system performance parameter, pre-FEC Q, of the WDM transmission system for the respective optical transmission link, OTL from the measured pre-FEC BER, wherein the derived system performance parameter, pre-FEC Q, is used to compute a maximum channel capacity for the respective optical channel.

13. A wavelength division multiplexing, WDM, system comprising:
  a transmitting transceiver for transmitting optical signals via an optical transmission link to a receiving transceiver using optical wavelengths in a WDM channel grid with a signal symbol rate, SR, each of the optical signals modulated with a modulation format;
  a Reconfigurable Optical Add Drop Multiplexer, ROADM, or another optical filter interposed on the optical transmission link, OTL, between the transmitting and receiving transceivers; and
  a controller operatively associated with the transmitting and receiving transceivers and adapted to maximize a channel capacity for each optical channel while maintaining a calculated channel margin, CM, is maintained above a preset minimal channel margin value by iteratively optimizing a system performance parameter, Q, of the optical WDM transmission system, which depends on a link effective bandwidth, BW, of the optical transmission link, OTL, representing the passband-filtering related impairments of the optical transmission link, OTL, and which depends on a generalized optical signal noise ratio, GOSNR, representing the noise related impairments of the optical transmission link, OTL, until the calculated channel margin, CM, is equal or larger than the present minimal channel margin value.

14. A wavelength division multiplexing, WDM, system design tool implemented in software on a computer and usable for planning an optical wavelength division multiplexing, WDM, transmission system by controlling the computer to perform steps comprising:
  selecting parameters of a software-defined transmitting transceiver and a software-defined receiving transmitter to provide a maximum channel capacity per optical channel using multiple optical channels in a WDM channel grid to transport optical signals modulated with a modulation format and with a signal symbol rate, SR, via an optical transmission link, OTL, along an optical path from the transmitting transceiver to the receiving transceiver, while maintaining a calculated channel margin, CM, above a preset minimal channel margin value, wherein the optical transmission link, OTL, comprises at least one Reconfigurable Optical Add Drop Multiplexer, ROADM or another optical filter; and wherein selecting the parameters of the transmitting and receiving transceivers includes iteratively optimizing a system performance parameter, Q, of the optical WDM transmission system which depends on a link effective bandwidth, BW, of the optical transmission link, OTL, representing the passband-filtering related impairments of the optical transmission link, OTL, and which depends on a generalized optical signal noise ratio, GOSNR, representing the noise related impairments of the optical transmission link, OTL, until the calculated channel margin, CM, is equal or larger than the present minimal channel margin value.

* * * * *